United States Patent [19]

Neugebauer et al.

[11] Patent Number: 5,039,781
[45] Date of Patent: Aug. 13, 1991

[54] POLYPHENYLENE ETHER END CAPPED WITH OXAZOLINE MOIETY

[75] Inventors: Wolfgang Neugebauer, Duelmen-Merfeld; Martin Bartmann, Recklinghausen; Udo Kowalczik, Bochum, all of Fed. Rep. of Germany

[73] Assignee: Huels Aktiengesellschaft, Marl, Fed. Rep. of Germany

[21] Appl. No.: 334,488

[22] Filed: Apr. 7, 1989

[30] Foreign Application Priority Data

Apr. 21, 1988 [DE] Fed. Rep. of Germany ....... 3813355

[51] Int. Cl.$^5$ .............................................. C08G 65/38
[52] U.S. Cl. ................................... 528/216; 528/212; 528/215
[58] Field of Search ......................................... 528/216

[56] References Cited

U.S. PATENT DOCUMENTS 3,313,776 4/1967 Borman .............................. 528/216

OTHER PUBLICATIONS

Polymer Bulletin, Band 12, Nr. 3, Sep. 1984, Springer-Verlag 1984, Seiten 261–268; V. Percec et al.: "Functional polymers and sequential copolymers by phase transfer catalysts". 12. Functional polymers containing 2-(p-phenoxy)-2-oxazoline . . . .

Primary Examiner—Harold D. Anderson
Attorney, Agent, or Firm—Oblon, Spivak, McClelland, Maier & Neustadt

[57] ABSTRACT

A polyphenylene ether having at least one functional end group of the formula:

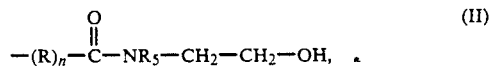

and/or

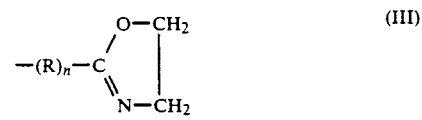

in which R is a divalent $C_{1-12}$ aliphatic group, n is 0 or 1, and $R_5$ is hydrogen, a $C_{1-8}$ alkyl group or a hydroxy-$C_{2-8}$-alkyl.

2 Claims, No Drawings

POLYPHENYLENE ETHER END CAPPED WITH OXAZOLINE MOIETY

BACKGROUND OF THE INVENTION

1. Field of the Invention

The present invention relates to polyphenylene ethers that have reactive end groups.

2. Description of the Background

Polyphenylene ethers (PPE) constitute a known class of thermoplastic structural materials that are distinguished by high-temperature dimensional stability and resistance to hot water, acid, and alkalies. Their preparation by oxidative coupling is described in detail in the patent literature (cf. U.S. Pat. Nos. 3,306,874; 3,306,875; European Patents 0 098 929, 0 099 965, 0 122 394, 0 137 139, and German Patent Application Disclosure 34 42 141). However, the extensive chemically inert nature of this polymer is a drawback for many applications such as, for example, blends with polyamides, and in such cases it is desirable for the PPE to contain a certain minimum quantity of reactive groups.

There are basically four possible ways for introducing functional groups in polyphenylene ethers:

I. The phenolic end groups of the unfunctionalized polyphenylene ether are reacted with suitable reagents such as anhydrides or acid chlorides (cf. German Patent 25 05 329 and WO 86/02 086).

II. The alkyl groups of the phenol in the 2- and 6-positions in the polyphenylene ether are chemically modified so that they become functional groups themselves.

III. A 2,6-dialkylated phenol is copolymerized with an appropriate phenol that has a functional group in the 4-position. It is well known that the molecular weight of the polyphenylene ether can be controlled in this way (cf. German Disclosure 17 45 201).

IV. A 2,6-dialkylated phenol is copolymerized with an appropriate functionalized phenol that has no functional group in the 4-position.

Process embodiment I is limited in application to compounds that are able to react with the slightly reactive phenolic end groups present in great dilution.

In the case of process embodiment II, the alkyl groups in the 2- and 6-positions enter into a chemical reaction with even greater difficulty. In practice, one is limited to the use of halogens and strong oxidizing agents that are able to extract a hydrogen atom from the alpha-carbon atom. For example, Japanese Disclosure 86/066 452 describes a process in which a polyphenylene ether is reacted in the melt with maleic anhydride and peroxide. The method presents problems, since the anhydride is volatile and very toxic under these conditions.

Another technique of introducing functional groups in polyphenylene ether is described by Percec et al in which oxazoline groups are distributed statistically along the polyphenylene ether chain. The side chains of PPE are first brominated and a phase transfer catalyzed etherification with the sodium salt of 2-(p-hydroxyphenyl)oxazoline is then carried out. The process requires a double change of solvent and does not provide bromine-free products (cf. Polymer Bulletin 12, 261 to 268 (1984)).

The oxidative coupling of phenols is well known to provide high-grade polymeric products only when the redox potentials of the phenol and of the catalyst are carefully matched to each other. For this reason and for practical reasons, 2,6-dimethylphenol is used almost exclusively in practice. Functional groups drastically change the oxidation potential of the phenol monomer. In fact, it is uncertain whether such functional phenols are incorporated during the polycondensation reaction at all. Copolymerization reactions such as described above in techniques III and IV must therefore be considered to be problematical.

Ortho- and meta-linked polyphenylene ethers that can be obtained by coupling p-substituted phenols of the formula:

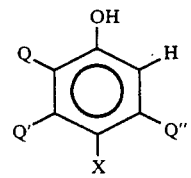

under pressure are described in German Patent specification 34 14 882. Substituent X in this formula is a halogen or almost any organic group that may also carry functional groups. For example, X is a substituted alkyl group of 1 to 20 carbon atoms or an aromatic oxazolyl group. The groups Q, Q', and Q" stand for hydrogen or a group with a maximum of 3 carbon atoms. However, because of their heterogeneous structure, characterized by severe branching and high nonuniformity and the different type of linking, these condensation products have only very remote similarity to the p-linked, "classical" polyphenylene ethers. A need therefore continues to exist for a polyphenylene ether which has a sufficiently high molecular weight whose functional end groups provide good compatibility with polyamides.

SUMMARY OF THE INVENTION

Accordingly, one object of the present invention is to provide a polyphenylene ether of sufficiently high molecular weight which has good compatibility with polyamide materials.

Briefly, this object and other objects of the present invention as hereinafter will become more readily apparent can be attained by a polyphenylene ether which has at least one functional end group of the formula:

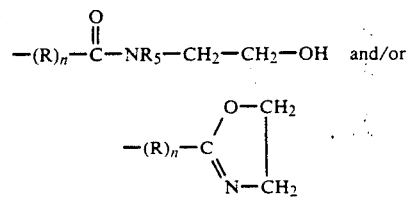

wherein R is a divalent $C_{1-12}$ aliphatic group, $R_5$ is hydrogen, a $C_{1-8}$ alkyl group, or a $C_{2-8}$ hydroxyalkyl group, and n has the value 0 or 1.

DETAILED DESCRIPTION OF THE PREFERRED EMBODIMENTS

The functionalized polyphenylene ethers of the present invention can be prepared by two fundamentally different procedures. The first procedure comprises polycondensing a mixture of 90 to 99.8 mole % of one or more phenols of the formula I:

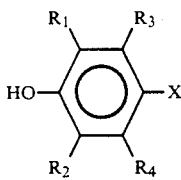

with 0.2 to 10 mole % of at least one functionalized phenol of formula II and/or III:

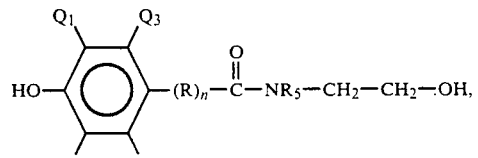

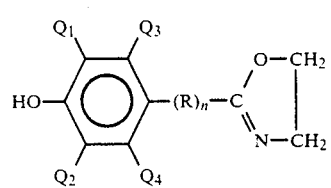

In the functionalized phenols above, radical R is a divalent aliphatic group of one to twelve carbon atoms which includes the likes of —CH$_2$—, —(CH$_2$)$_2$—, —C(CH$_3$)CH$_2$—, —CH$_2$(C$_6$H$_5$)CH$_2$— and —CH(C$_6$H$_5$)—. In the functionalized phenol of formula II, substituent R$_5$ is hydrogen, a C$_{1-8}$ alkyl group of the likes of methyl, ethyl, n-butyl and 2-ethylhexyl or a C$_{2-8}$ hydroxyalkyl group of the likes of 2-hydroxyethyl, 2-hydroxypropyl and 2-hydroxy-2-phenylethyl.

The second procedure comprises equilibrating a polycondensation product of a phenol of formula I with a phenol of formulas II or III.

As such the functionalized polyphenylene ether product obtained contains from 0.2 to 10 mole % of functional groups based on the monomer units of the polyphenylene ether product.

The two procedures described provide polyphenylene ethers with sufficiently high molecular weight that are very compatible with polyamides, in a surprisingly simple way.

Phenols of formula I:

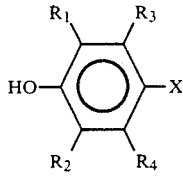

are starting materials for the process of the invention. In this formula, R$_1$ and R$_2$ are groups selected from the groups of alkyl groups of 1 to 10 carbon atoms, cycloalkyl of 5 to 10 carbon atoms, aryl of 6 to 10 carbon atoms, and benzyl.

The groups R$_1$ and R$_2$ can be different, but preferably R$_1$ and R$_2$ are the same. The alkyl group can be a primary, secondary, or tertiary alkyl group. However, if one of the two groups is a tertiary alkyl, the other group should not at the same time be a tertiary alkyl group. R$_3$ and R$_4$ either are hydrogen or have the same meaning given above for the groups R$_1$ and R$_2$. Substituent X is a halogen, particularly bromine, or hydrogen.

2,6-Dimethylphenol is preferred as the starting material. However, 2-methyl-6-ethylphenol, 2,6-diethylphenol, 2-methyl-6-t-butylphenol, 4-bromo-2,6-dimethylphenol, 4-bromo-2,6-diphenylphenol, 2,3,6-trimethylphenol, as well as 2-allyl-6-methylphenol and 2,6-dibenzylphenol are also very suitable.

An important component of the starting material of the process of the present invention is a phenol of the formula II:

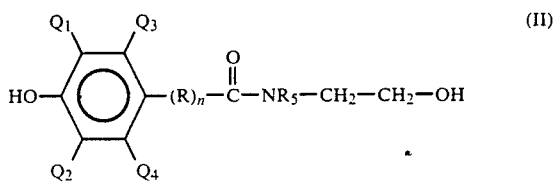

and/or of the formula III:

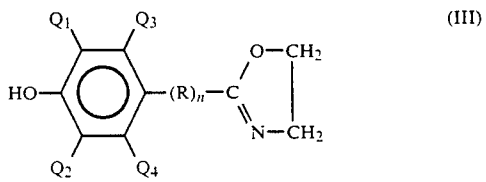

The groups Q$_1$, Q$_2$, Q$_3$, and Q$_4$ have the same meanings as indicated above for R$_1$, R$_2$, R$_3$, and R$_4$, respectively.

Of the phenols of formula III above, preferred are the oxazoline-2,6-dimethylphenols, while preferred compounds of formula II are the 2-hydroxyethylamides where R is a direct linkage, —CH$_2$—, —(CH$_2$)$_2$— and —CH(C$_6$H$_5$)CH$_2$—. Especially preferred compounds of formulas II and III are N-2-hydroxyethyl-4-hydroxy-3,5-dimethylbenzamide, 2-(4-hydroxy-3,5-dimethylphenyl)-2-oxazoline and 2-(4-hydroxy-3,5-dimethylphenyl)-2-phenylpropionic acid 2-hydroxyethylamide.

These functionalized phenols can be prepared by various procedures which are known. For example, (a) for the synthesis of the oxazoline and hydroxyethylamide compounds above where n=0, the sodium or potassium salt of 2,6-dimethylphenol is carboxylated, and then reacted with ethanolamine either directly or through the methyl ester. By treatment of the hydroxyethylamide compound with thionyl chloride and then with aqueous sodium bicarbonate solution, conversion to the oxazoline derivative can be achieved (cf. V. Percec et al., J. Polym. Sci., Polym. Lett. Ed. 22, 523–532 (1984));

(b) for the synthesis of the oxazoline compounds where n=1 and R is methylene or —C$_2$H$_4$—, 4-acetyl- or 4-propionyl-2,6-dimethylphenol is reacted with sulfur and an amine by the Willgeroth-Kindler method, and then the carboxylic acid obtained is derivatized (cf. E. Schwenk, D. Papa, J. Org. Chem. 11, 798 (1946));

(c) for the synthesis of the oxazoline and hydroxyethylamide where n=1 and R is substituted —C$_2$H$_4$—, 2,6-dimethyl-phenol is reacted with acrylic acid or a substituted acrylic acid derivative under Bronsted or Lewis acid catalysis (electrophilic substitution in the para-position), and then the carboxylic acid is derivatized (cf. L. J. Smith et al., J. Am. Chem. Soc. 65, 282, 287 (1943)); and (d) for the synthesis of the oxazoline and hydroxyethylamide compounds similar to (c), other unsaturated but nonconjugated carboxylic acids or their derivatives can also be used if they are able to add electrophilically to phenols such as the Diels-Alder adduct of isoprene and acrylic acid (see European Disclosure 0 106 799).

Another synthesis embodiment of the present invention is to first prepare a polyphenylene ether with N-(2-hydroxyethyl)amide groups and only thereafter close the oxazoline ring by reacting the amide intermediate in the presence of a dehydrating agent, for example. Conversely, the oxazoline ring can be opened by the addition of water at elevated temperature, optionally with catalysis by alkali metal hydroxides. It is also conceivable first to use a comonomer containing ester groups similarly to German Disclosure 17 45 201, and then to treat the polyphenylene ether containing ester groups in solution or in a melt with ethanolamine. However, this method is not recommended since the amidation proceeds more slowly and less completely because of the low concentration of end groups, and more drastic conditions are therefore needed than when the amidation is carried out earlier with the comonomer.

The polycondensation reaction in which a phenol is reacted with a functionalized phenol of the present invention is conducted in the presence of pure oxygen or air that has been enriched or depleted of oxygen. The procedure is preferably carried out at atmospheric pressure, but depending on the other process parameters, the use of reduced pressure or increased pressure is also possible. A metal salt catalyst may also be used as is known in the art such as for example, copper(II) chloride, copper(II) bromide, or manganese(II) chloride. The basic cocatalyst is usually a primary, secondary, or tertiary amine or diamine or a mixture thereof. When phenols containing halogen are used, the addition of a stronger base such as sodium hydroxide or sodium ethoxide is recommended.

U.S. Pat. Nos. 3,306,874 and 3,306,875 are incorporated by reference herein for providing teachings of how to conduct a polycondensation to form a polyphenylene ether.

Having generally described this invention, a further understanding can be obtained by reference to certain specific examples which are provided herein for purposes of illustration only and are not intended to be limiting unless otherwise specified.

The viscosity number J of the functionalized polyphenylene ethers prepared in the following examples is measured according to the procedure set forth in DIN 53 728 at 25° C. in chloroform (concentration 0.5 g/100 ml of solution).

EXAMPLE 1.1

Preparation of N-(2-hydroxyethyl)-4-hydroxy-3,5-dimethylbenzamide

A 270 g quantity of methyl 4-hydroxy-3,5-dimethylbenzoate is heated in 300 ml of ethanolamine for 6 hours at a bath temperature of 160° C. while simultaneously removing the methanol which forms by distillation. The excess ethanolamine is removed under vacuum. The glassy product is ground, screened (1 mm screen), and dried thoroughly at 0.5 torr and 60° C. for a yield of 307 g.

Data: $^1$H NMR (CDCl$_3$) Delta=3.37 (t; CH$_2$); 3.55 (t; CH$_2$)

$C_{11}H_{15}O_3N$ (209.27): Calc. C 63.13, H 7.24, O 22.94, N 6.69; Found C 62.54, H 7.31, O 23.42, N 6.72.

EXAMPLE 1.2

Preparation of 2-(4-hydroxy-3,5-dimethylphenyl)-2-oxazoline

A 156.75 g quantity of the amide obtained prepared according to the procedure of Example 1.1 is boiled under reflux in 650 ml of dichloromethane, while 75 ml of thionyl chloride is added dropwise over a period of 3 hours. After an additional 15 hours of reflux, the reaction mixture is cooled to 5° C., filtered by suction, and the precipitate is washed with 200 ml of chilled methylene chloride. After drying, the substance is slurried in 300 ml of water, and a solution of 67.2 g of sodium bicarbonate in 400 ml of water is added slowly dropwise (evolution of CO$_2$). The mixture is stirred for 2 hours, then cooled to 5° C., and the precipitate is filtered by suction and washed with 160 ml of ice water yielding 129.0 g of product having a melting point of 184° to 186° C.

Data: $^1$H NMR (CDCl$_3$): Delta=3.87 (t; CH$_2$); 4.42 (t; CH$_2$)

$C_{11}H_{13}O_2N$ (191.25): Calc. C 69.08, H 6.87, O 16.73, N 7.33; Found C 68.87, H 6.82, O 17.04, N 7.26.

EXAMPLE 1.3

2-(4-Hydroxy-3,5-dimethylphenyl)acetic acid is prepared in a known way (cf. J. Org. Chem. 11, 798 (1946)) from 4-acetyl-2,6-dimethylphenol, sulfur, and morpholine (Willgeroth-Kindler Reaction) and has a melting point of 147° C. The acid is converted into the 2-hydroxyethylamide (yellow-brown oil) through the methyl ester (melting point 95° C.) by the method of Example 1.1.

$C_{12}H_{17}O_3N$ (223.30): Calc. C 64.54, H 7.69, O 21.50, N 6.27; Found C 63.67, H 7.81, O 22.14, N 6.38.

EXAMPLE 1.4

3-Methyl-3-(hydroxy-3,5-dimethylphenyl)butyric acid is prepared in a known way (cf. J. Am. Chem. Soc. 65, 282, 287 (1943)) from 2,6-dimethylphenol, beta, beta-dimethylacrylic acid, and aluminum trichloride in tetrachloroethylene while introducing hydrogen chloride therein. The product has a melting point of 89° C. It is converted into the 2-hydroxyethylamide (yellow oil) through the methyl ester (melting point 83° C.) by the method of Example 1.1.

$C_{15}H_{23}O_3N$ (265.39): Calc. C 67.88, H 8.75, O 18.09, N 5.28; Found C 67.63, H 8.78, O 18.36, N 5.21.

EXAMPLE 2.1

1000 l/h of air is passed through a mixture consisting of .8 liters of toluene, 1.4 liters of methanol, 160 g of morpholine, and 40 g of a catalyst solution consisting of 31 g of 48% hydrobromic acid and 10 g of basic copper carbonate at 30° C. A mixture of 792 g of 2,6-dimethylphenol (99.0 mole-%), 12.53 g of 2-(4-hydroxy-3,5-dimethylphenyl)-2-oxazoline (1.0 mole-%), and 900 ml of toluene is added over a period of 20 minutes. The mixture is then allowed to react for 70 minutes longer and the reaction is terminated by adding a mixture of 2.30 liters of water and 7 g of triethanolamine and introducing CO$_2$ for 10 minutes (2000 l/h). The organic phase is separated, treated with 8 g of 2,6-di-t-butyl-4- methylphenol, 3 liters of water, and 9 g of triethanolamine, and is boiled under reflux for 15 minutes. After being separated again, material is precipitated from the organic phase by the addition of 20 liters of methanol, and the product is washed with methanol and dried. Yield 734 g; J=46 cm$^3$/g. Analysis N: Calc. 0.16%; Found 0.18%.

EXAMPLE 2.2

Using the procedure described in Example 2.1, a mixture of 77.6 g of 2,6-dimethylphenol (97.0 mole-%) and 3.76 g of 2-(4-hydroxy-3,5-dimethylphenyl)-2-oxazoline (3.0 mole-%) is polycondensed.

Data: J=21 cm$^3$/g. $^1$H NMR (CHCl$_3$): Delta=4.05 (t; CH$_2$); 4.43 (t; CH$_2$.) Analysis N: Calc. 0.34%; Found 0.32%.

EXAMPLE 2.3

Using the method of Example 2.1, a mixture of 77.6 g of 2,6-dimethylphenol (97.0 mole-%) and 4.10 g of N-(2-hydroxyethyl)-4-hydroxy-3,5-dimethylbenzamide (3.0 mole-%) is polycondensed.

Data: J=29 cm$^3$/g. $^1$H NMR (CDCl$_3$): Delta=3.63 (t; CH$_2$); 3.85 (t; CH$_2$). Analysis N: Calc. 0.34%; Found 0.23%

EXAMPLE 2.4

Using the method of Example 2.1, a mixture of 77.6 g (97.0 mole %) of 2,6-dimethylphenol and 4.37 g (3.0 mole %) of N-(2-hydroxyethyl)-2-(4-hydroxy-3,5-dimethylphenyl)acetamide (see Example 1.3) is reacted.

Data: J=22 cm$^3$/g. Analysis N: Calc. 0.34%; Found 0.32%.

EXAMPLE 2.5

Using the method of Example 2.1, a mixture of 76.0 g (95.0 mole %) of 2,6-dimethylphenol and 8.7 g (5.0 mole %) of N-(2-hydroxymethyl)-3-methyl-3-(4-hydroxy-3,5-dimethylphenyl)butyramide (see Example 1.4) is reacted.

Data: J=18 cm$^3$/g; Analysis N: Calc. 0.47%; Found 0.45%.

Obviously, numerous modifications and variations of the present invention are possible in light of the above teachings. It is therefore to be understood that within the scope of the appended claims, the invention may be practiced otherwise than as specifically described herein.

What is claimed is:

1. A polyphenylene ether having at least one functional end group of the formula:

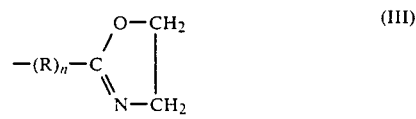

in which R is a divalent C$_{1-12}$ aliphatic group, n is 0 or 1.

2. The polyphenylene ether of claim 1, wherein the functionalized polymer product contains from 0.2 to 10 mole % of functional groups based on the monomer units of the polymer product.

* * * * *